(12) United States Patent  
Kikuchi et al.

(10) Patent No.: US 6,492,750 B2
(45) Date of Patent: Dec. 10, 2002

(54) AUTOMATIC EQUALIZER

(75) Inventors: Yoshimi Kikuchi, Nagano (JP); Daisuke Higuchi, Nagano (JP); Kian Hock Yeoh, Nagano (JP)

(73) Assignee: Kabushiki Kaisha Sankyo Seiki Seisakusho, Nagano (JP)

( * ) Notice: Subject to any disclaimer, the term of this patent is extended or adjusted under 35 U.S.C. 154(b) by 0 days.

(21) Appl. No.: 09/773,737

(22) Filed: Feb. 2, 2001

(65) Prior Publication Data

US 2001/0010435 A1 Aug. 2, 2001

(30) Foreign Application Priority Data

Feb. 2, 2000 (JP) ........................ 2000-025676
Mar. 9, 2000 (JP) ........................ 2000-064655
Mar. 15, 2000 (JP) ........................ 2000-073024

(51) Int. Cl.$^7$ .................... G11B 19/20; F16F 15/22; H02K 7/04; H02K 5/24
(52) U.S. Cl. .................... 310/51; 310/67 R; 360/99.08; 369/266; 74/572; 74/573 R; 74/573 F; 74/574
(58) Field of Search ................. 310/51, 67 R, 310/91; 360/98.07, 99.04, 99.05, 99.08, 97.01, 99.12; 369/266, 263; 74/572, 573 R, 573 F, 574

(56) References Cited

U.S. PATENT DOCUMENTS

| | | | | |
|---|---|---|---|---|
| 3,408,111 A | * | 10/1968 | Foote | 301/5 |
| 3,733,923 A | * | 5/1973 | Goodrich et al. | 188/378 |
| 3,854,347 A | * | 12/1974 | Hellerich | 360/137 |
| 4,674,356 A | * | 6/1987 | Kilgore | 301/5.22 |
| 5,806,349 A | * | 9/1998 | Kim et al. | 68/23.2 |
| 5,941,133 A | * | 8/1999 | Wierzba et al. | 74/572 |
| 6,205,110 B1 | * | 3/2001 | Miyamoto et al. | 360/99.08 |
| 6,333,912 B1 | * | 12/2001 | Sohn | 369/263 |

FOREIGN PATENT DOCUMENTS

JP 10-257710 A 9/1998 ............ H02K/7/04

* cited by examiner

Primary Examiner—Nestor Ramirez
Assistant Examiner—Dang Dinh Le
(74) Attorney, Agent, or Firm—Sughrue Mion, PLLC

(57) ABSTRACT

A cylindrical case provided with a chamber is coaxially attached to a rotary shaft of a motor. A plurality of balancers are movably provided within the chamber so as to cancel a rotation eccentricity of the motor. A viscous member such as high viscosity fluid is provided on at least one of the surfaces of the balancers and an inner face of the chamber.

15 Claims, 9 Drawing Sheets

AUTOMATIC EQUALIZER

BACKGROUND OF THE INVENTION

The present invention relates to an automatic equalizer for canceling rotational unbalance occurring when a rotator is rotated, and relates to a motor incorporating the automatic equalizer.

In various kinds of rotation driving apparatus used for industrial machinery, domestic electric products, or computer, an automatic equalizer is often used to cancel rotational unbalance of a rotator including a rotary shaft.

For example, in the case that the rotator is a disk having bias of weight caused by label of disk face and eccentricity of disk, "centrifugal whirling" phenomena occurs, which makes a rotary shaft bend largely at certain rotation number. To cancel such the "centrifugal whirling", an automatic equalizer keeping rotation balance by inserting plural steel balls into a groove of concentric circles shape was proposed. Such a technique is disclosed in Japanese Patent Publication No. 10-257710A.

There will be explained the related automatic equalizer with reference to FIGS. 1 and 2. A steel ball 45 of balancing member in a case 41 is separated from a magnet 43 with rotation, moves to stable position contacting to an outer circumference wall 41b, and adheres to the magnet 43 at stop of rotation. The related automatic equalizer has a large problem in collision noise with the outer circumference wall 41b and the magnet 43 or running noise (friction noise and rolling noise) caused by movement of the steel ball 45 with such the rotation. Further, there is a problem that the outer circumference wall 41b and the magnet 43 are damage because of impact of collision.

For such the problem, in the publication, there is proposed a method for preventing generation of noise and damage by providing shock absorber made of buffer material such as synthetic resin or rubber at inner face of the outer circumference wall 41b or outer surrounding face of the magnet 43 or by forming similar protect member at surface of the steel ball 45.

However, the method of surface treatment by such the synthetic resin or rubber is rather difficult with high cost.

Further, although aligning action operates corresponding to bias load in vertical face by the steel ball 45 moving to circumference direction, aligning action does not operate to bias load in axial direction. That is, the method does not function as a sufficient automatic equalizer.

SUMMARY OF THE INVENTION

It is therefore an object of the invention is to provide an automatic equalizer decreasing collision noise and running noise of a balancer in a case, and realizing a mechanism reducing damage caused by collision with low cost.

Specifically, the object is to provide the automatic equalizer that surface of the balancer is not treated at all by synthetic resin or rubber.

Another object is to provide an automatic equalizer preventing collision noise of each other and damage caused by collision in the unstable condition of the steel ball 45 at low rotation number less than a resonant rotation number CR without using the magnet 43 adhering the steel ball 45 at all.

Further, another object is to provide an automatic equalizer that automatic aligning action operates not only to bias load in vertical face but also to bias load at axial direction.

In order to achieve the above objects, according to the present invention, there is provided an automatic equalizer a motor, comprising:

- a cylindrical case provided with a chamber, the case coaxially attached to a rotary shaft of the motor;
- a plurality of balancers movably provided within the chamber so as to cancel a rotation eccentricity of the motor; and
- a viscous member provided on at least one of surfaces of the balancers and an inner face of the chamber.

In this configuration, collision noise among the balancers and the inner wall of the case can be reduced with low cost. Further, damages due to impact at collision can be prevented with low cost.

Preferably, high viscosity fluid is provided as the viscous member such as silicon oil or magnetic fluid.

Preferably, the high viscosity fluid is coated on at least one of the surfaces of the balancers and the inner wall of the chamber, or injected into the chambers. In this configuration, reducing cost can be realized.

According to the present invention, there is also provided An automatic equalizer a motor, comprising:

- a cylindrical case provided with a chamber, the case coaxially attached to a rotary shaft of the motor; and
- a plurality of balancers movably provided within the chamber so as to cancel a rotation eccentricity of the motor,
- wherein elasticity of at least each surface of the balancers are reduced by annealing.

In this configuration, collision noise among the balancers and the inner wall of the case can be reduced with low cost. Further, damages due to impact at collision can be prevented with low cost.

According to the present invention, there is also provided an automatic equalizer for a motor, comprising:

- a cylindrical case provided with a chamber, the case coaxially attached to a rotary shaft of the motor;
- a plurality of balancers movably provided within the chamber so as to cancel a rotation eccentricity of the motor;
- an inner step portion provided in a center portion of the chamber, for holding the balancers therein when a rotation number of the motor is lower than a predetermined standard rotation number,
- wherein the inner step portion has a height which is determined such that the balancer held in the recess portion climbs over the step portion and moves to a region outer than the recess portion by centrifugal force occurring when the rotation number exceeds the standard rotation number.

In this configuration, since the balancers are surely held in the inner step portion, noise and damage due to mutual contact of the balancers can be reduced with simple construction. Further, since the balancers can be moved smoothly, the accurate automatic equalizer and the motor incorporating the same can be realized with low cost.

Since the balancers start to climb over the inner step portion when the rotation number of the motor exceeds the standard rotation number, timing of start to move of each balancer can be managed with high accuracy so as to obtain stable balance performance.

Preferably, the standard rotation number is substantially same as a resonant rotation number of the motor. In this configuration, since the balancers start to move when the rotation number reaches the resonance resonant rotation number which is the earliest timing capable of starting to move, the balancers keep rotation balance extremely quickly.

More preferably, the standard rotation number is higher than the resonant rotation number. In this configuration, the balancers are surely moved to direction keeping balance of the motor.

Preferably, the inner step portion includes a plurality of independent recess portions for holding the respective balancers therein, which are arranged around the rotary shaft with a predetermined pitch. In this configuration, since each balancer in the recess portion is surely held to keep rotation balance at low speed rotation less than the standard rotation number, stable rotation condition is obtained in the entire area of served rotation number.

Preferably, the chamber is provided with:

a holding member formed on an inner face of an outer circumference wall thereof, for holding the balancers thereon when the rotation number of the motor is a rated rotation number which is higher than a resonance rotation number of the motor; and a slope extending downward from the holding member to the inner step portion to guide the balancers to the inner step portion when the rotation number of the motor becomes lower than the standard rotation number.

In this configuration, each balancer is moved to the inner step portion when the rotation number becomes in low speed rotation state, and stable rotation state is repeated returning each balancer to the inner step portion.

According to the present invention, there is also provided An automatic equalizer for a motor, comprising:

a cylindrical case provided with a chamber, the case coaxially attached to a rotary shaft of the motor; and a plurality of balancers movably provided within the chamber so as to be movable in an axial direction of the rotary shaft and a circumference direction of the case, for canceling a rotation eccentricity of the motor, wherein the balancers start to move when a rotation number of the motor exceeds a resonant rotation number of the motor.

In this configuration, the automatic equalizer acts so as to align automatically against not only bias load in the circumference direction of the balancers but bias load in the axial direction.

Preferably, a vertical cross section of an inner face at an outermost portion of the chamber is straight.

Alternatively, a vertical cross section of an inner face at an outermost portion of the chamber is curved. In this configuration, it is possible that each balancer moves smoothly along the inner face of the chamber, so that time till aligning automatically is shortened.

Preferably, a plurality of independent chambers are concentrically provided in the case. In this configuration, the automatic alignment in the circumference direction and the axial direction can be conducted at plural position in the radius direction of the case.

Preferably, the balancers are movable in a radial direction of the case. A dimension of the chamber in the axial direction is made larger toward outside of the radial direction. In this configuration, it is possible to cancel amplification of swing of rotation caused of moving of the balancers at beginning of rotation.

DETAILED DESCRIPTION OF THE PREFERRED EMBODIMENTS

There will be described below in detail preferred embodiments of the present invention with reference to the accompanying drawings.

Figure 1:
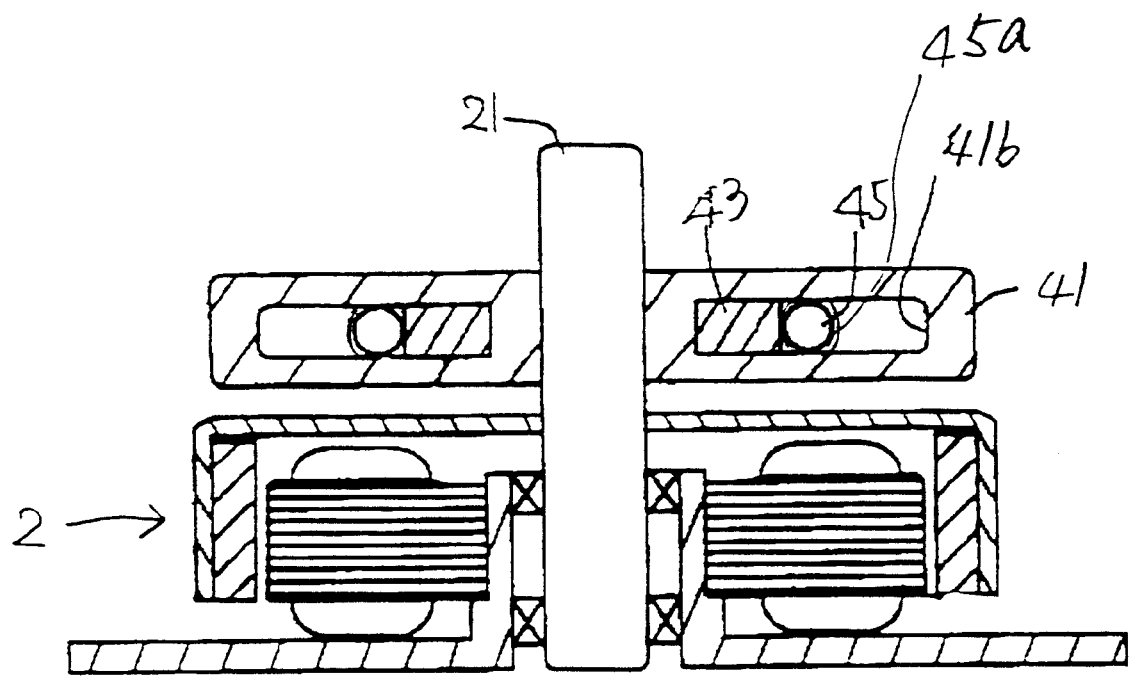
FIG. 1 is a vertical sectional view showing a motor provided with an automatic equalizer according to a first embodiment of the invention.
Figure 2:
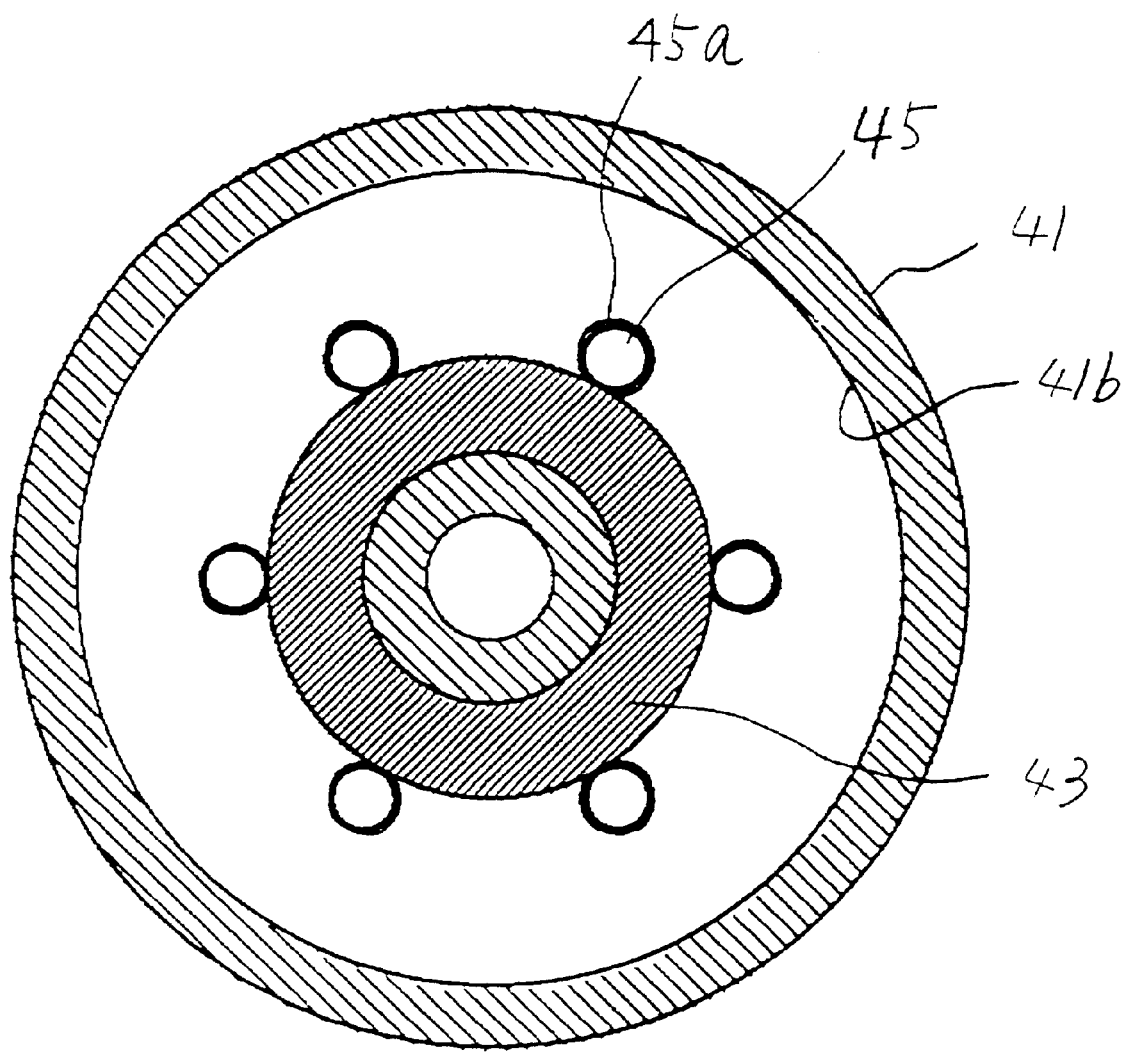
FIG. 2 is a sectional plan view showing the construction of the automatic equalizer of FIG. 1.
Figure 3:
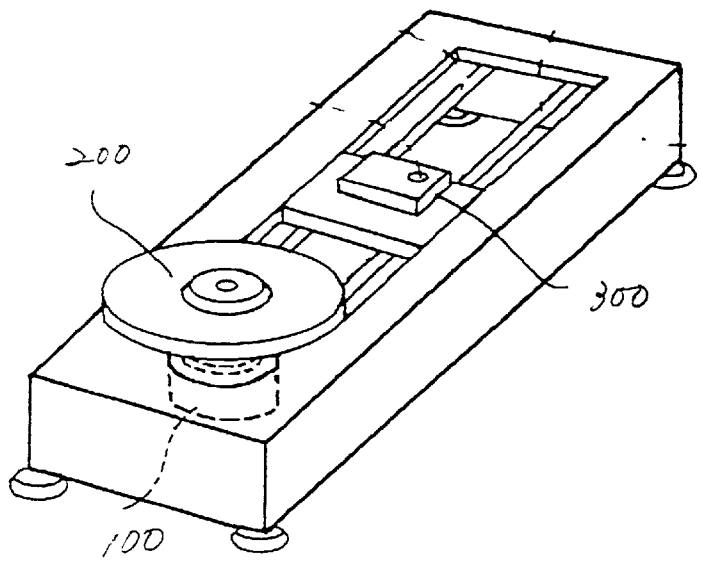
FIG. 3 is a perspective view showing a CD-ROM driving unit incorporating the automatic equalizer of the invention.

FIGS. 1 and 2 show a spindle motor 2 provided with an automatic equalizer according to a first embodiment of the invention. FIG. 3 shows a CD-ROM driving unit having an optical pick up device 300 for recording/reading information on an optomagnetic disk 200 by applying laser beam. The automatic equalizer is provided as a driving source 100 operating to rotate the optomagnetic disk 200.

In this embodiment, a viscous part 45a is formed on a surface of a steel ball 45 arranged in a case 41 as shown in FIG. 1 and FIG. 2. High viscosity fluid such as silicon oil or magnetic fluid is applied to the surface of the steel ball 45 to form the viscous part 45a.

Thus, collision noise of the steel ball 45 and the outer circumference wall 41b or the magnet 43 is reduced simply and surely, and impact at collision is reduced so as not to do damage. Running noise generating by collision of the steel balls 45 themselves can be reduced. Especially, the problem of the running noise is not solved only by providing the buffer member made of elastic material such as synthetic resin or rubber at inner face of the outer circumference wall 41b of the case 41 or outer circumference face of the magnet 43, so surface treatment of the steel ball 45 is indispensable.

On the other hand, the method applying high viscosity fluid to the surface of the steel ball 45 is simple comparing with surface treatment by synthetic resin or rubber so as to decrease cost considerably.

In addition to form the viscous part 45a at the surface of the steel ball 45, a viscous part may be formed at the inner face of the outer circumference wall 41b in the case 41 and the outer circumference face of the magnet 43. Even only applying high viscosity fluid to outer circumference wall 41b in the case 41 and the magnet 43, high viscosity fluid adheres indirectly on the surface of the steel ball 45 moving in the case so as to obtain similar effect.

High viscosity fluid may be injected into a space portion in the case 1.

Instead of forming the viscous part 45a at surface of the steel ball 45, there may be used a steel ball in which at least surface elasticity modulus is decreased by annealing. In this case, since the surface repulsion of the steel ball 45 is made low, the collision noise is reduced when the steel balls 45 themselves collide and the steel ball 45 collides with inner wall or outer circumference face of the magnet 43. That is, similar effect is obtained as forming viscous part 45a at the surface of the steel ball 45. The annealing is rather easy process comparing with the method of the surface treatment by synthetic resin or rubber so as to reduce cost considerably.

Since viscosity force of the viscosity body member 45a is added to the magnetic force of the magnet 43, attractive force between the magnet 43 and the steel ball 45 is increased. Therefore, rotation torque at start of rotation can be transferred efficiently to the steel ball 45 so as to realize balanced rotation at start of rotation.

In this embodiment, although the steel ball 45 is used for the balancer, the shape thereof is not limited in the ball but may be columnar or barrel shape. Further, it may be combined with the structure where buffer member made of elastic material such as synthetic resin or rubber at inner face of the outer circumference wall 41b of the case 41 and outer face of the magnet 43.

Figure 4:
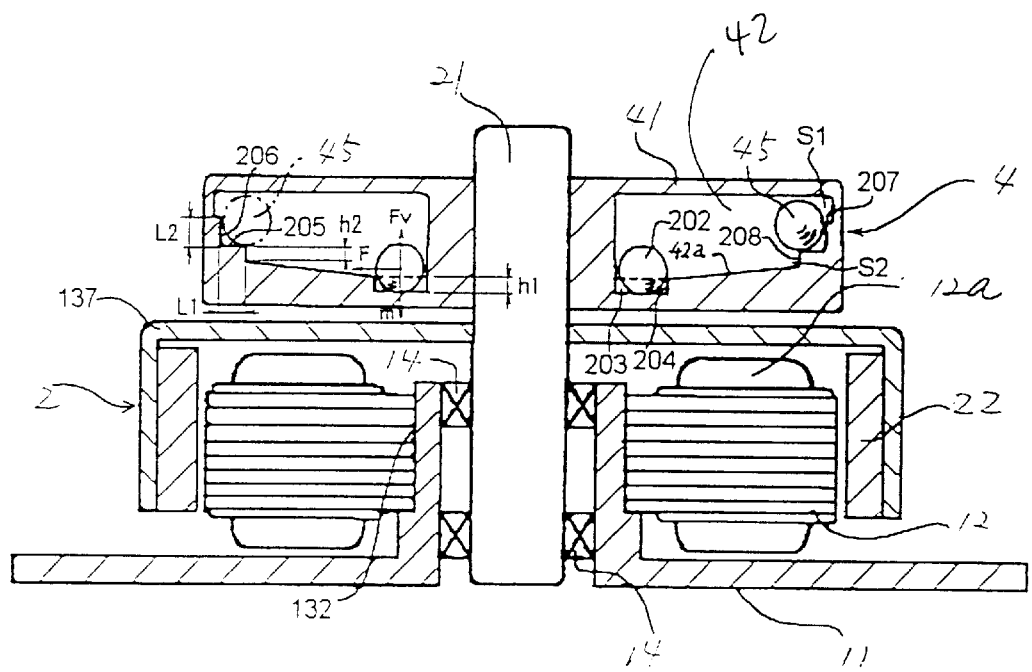
FIG. 4 is a vertical sectional view showing a motor provided with an automatic equalizer according to a second embodiment of the invention.

FIG. 4 shows a spindle motor provided with an automatic equalizer according to a second embodiment of the invention. In the spindle motor 2, a bearing holder 132 of hollow cylindrical shape is formed integrally with a main body frame 11 so as to be upright therefrom. At inner portion of the bearing holder 132, bearing members 14 are attached by press fitting from both end portions, upper and lower portions in the figure, of the bearing holder 132. These bearing members 14 are fixed by pushing the bearing members to end face of annular stoppers (not shown) formed projecting to center portion of axial direction at the inner face of the bearing holder 132 coaxially arranged. For each bearing member 14, various kinds of means of bearing such as oil retaining bearing, bearing, hydrodynamic bearing device and etc. may be used.

A rotary shaft 21 is supported rotatably at center portion of said bearing holder 132 thorough a pair of the bearing members 14, and a stator core 12 comprising layered body of silicon steel plate is attached tightly at wall face of outer circumference side of the bearing holder 132. At the surface of the stator core 12, an insulation film is coated, and coils 12a are wound at part corresponding to each salient-pole portion of the stator core 12 through the insulation film.

On the other hand, at intermediate position of the rotary shaft 21, a rotor case 137 of almost cup shape is fixed, and an annular rotor magnet 22 is fixed at an inner face of an outer circumference wall of the rotor case 137. The inner circumference face of the rotor magnet 22 is arranged so as to approach from outer side of radius direction to each salient-pole portion of the stator core 12.

An automatic equalizer 4 is attached at a tip portion of upper side of the rotary shaft 21 shown in the figure, and at upper side of the automatic equalizer 4 shown in the figure, a disk table (not shown) for attaching the optomagnetic disk 200 is provided.

Figure 5:
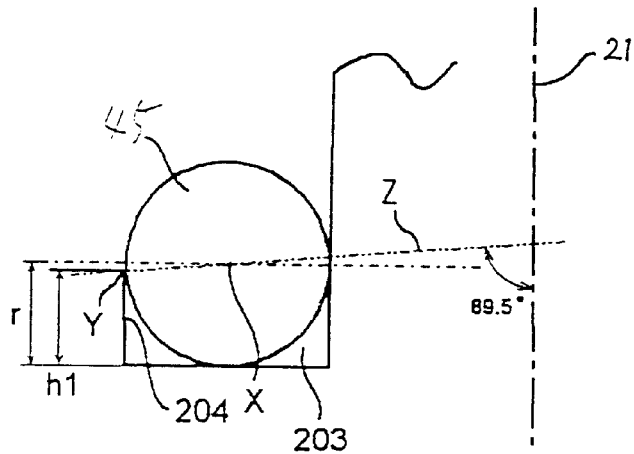
FIG. 5 is an enlarged sectional view showing an inner circumference part of the automatic equalizer of FIG. 4.
Figure 6:
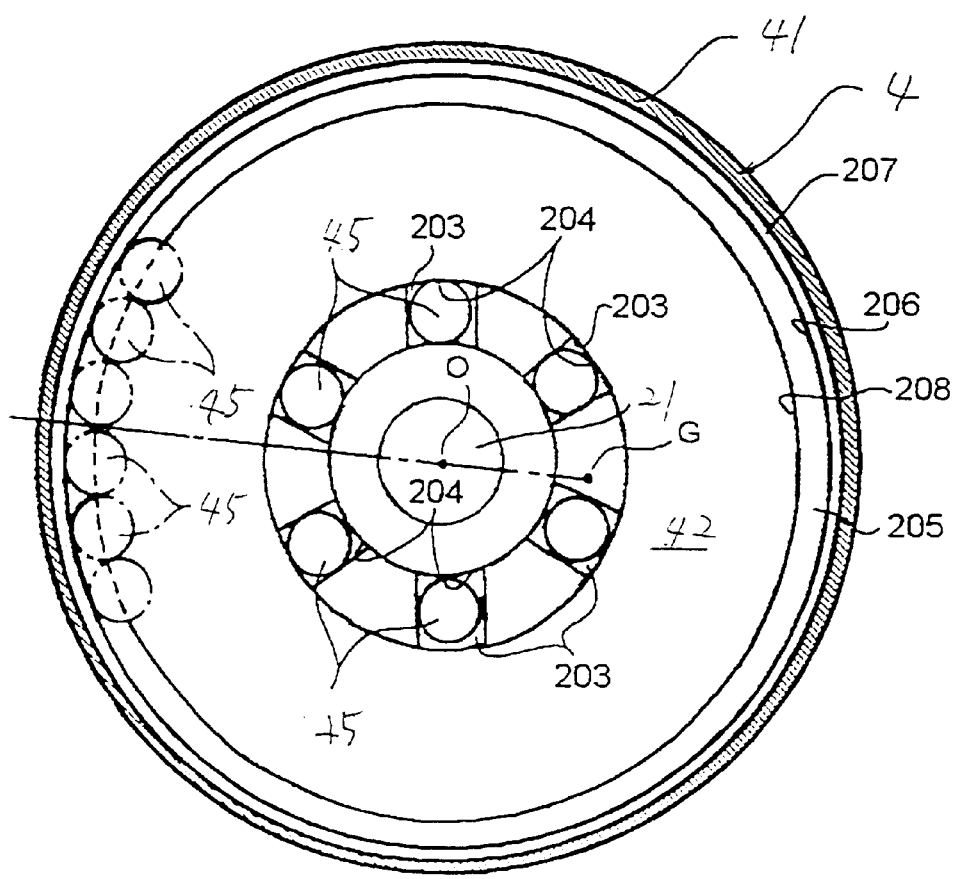
FIG. 6 is a sectional plan view showing the automatic equalizer of FIG. 4.

A hollow-shaped case 41 is fixed so as to rotate integrally with the rotary shaft 21 at the rotary shaft 21 as shown in FIGS. 4, 5, and 6. The case 41 comprises a disk-shaped case member formed by metal or resin material, plural steel balls 45 (6 pieces in the embodiment) are arranged in the state that these can move freely in the hollow part of the case 41. When the rotation number of whole rotator including the rotary shaft 21 and case 41 becomes rated rotation number higher than a resonant rotation number CR, the steel balls 45 move to direction in which rotation unbalance of said rotator is canceled.

At a center area of the case 41, recess portions 203 of groove shape for storing the each steel ball 45 are arranged annularly so as to surround said rotary shaft 21. Although each of these recess portion 203 has function storing and keeping the each steel ball 45 inside at low speed rotation, each recess portion 203 is provided being separated with almost equal intervals to circumference direction, and in the embodiment, number of recess portions provided is the same as the number of the steel balls 45 (6 pieces in the embodiment). In the state that said each steel ball 45 is stored inside of each recess portion 203, each steel ball 45 is kept in the state separating the steel balls one by one with almost equal intervals to circumference direction.

An outer circumference wall of each recess portion 203 forms an inner step portion 204 having designated difference in level to control moving of each steel ball 45 to outside of radius direction. When the rotation number of said rotator is lower than a predetermined standard rotation number SR, each steel ball 45 is kept inside of each storage concave 203.

In each steel ball 45, centrifugal force F by rotation of rotator acts toward outer side of radius direction, and upper side component Fv of the centrifugal force F acting to each ball body 45 changes by the height hi of difference in level formed by the inner step portion 204 especially as shown in FIGS. 4 and 5. When the upper side component Fv of the centrifugal force F acting to each ball body 45 is more than self-weight m of the steel ball with increase of the rotation number, each steel ball 45 moves to an area of outer side of the radius direction so as to climb over the inner step portion 204.

Thus, the floatation force Fv acting to each steel ball 45 is first set to designated magnitude by suitably adjusting the height hi of each inner step portion 204. The floatation force Fv acting to each steel ball 45 is set so as to become less than self-weight m of the steel ball 45 at low speed rotation that the rotation number of said rotator is less than the standard rotation number SR. When the rotation number of the rotator is higher than the standard rotation number SR, the floatation force Fv acting to each steel ball 45 is set so as to become larger than the self-weight m of the steel ball 45.

That is, the height hi of the inner step portion 204 is set to height that each steel ball 45 is kept in the recess portion 203 in the case that rotation number of said rotator is within range of the low speed rotation number less than the standard rotation number SR. The height hi set to height that each steel ball 45 jumps up from inside of each recess portion 203 to outer side of radius direction so as to climb over the inner step portion 204 when the rotation number of the rotator becomes high speed rotation number higher than the standard rotation number SR. The height hi of the inner step portion 204 is set to be slightly less than a radius r of the steel ball 45 (h1<r), and is set so that line segment Z connecting a center X of the steel ball 45 and a corner portion Y of the inner step portion 204 is about 89.5° with respect to the axis of said rotary shaft 21 as shown in FIG. 5, for example.

In the embodiment, the standard rotation number SR is determined so as to be almost same as the resonant rotation number CR of said rotator, and the standard rotation number SR is set to slightly larger than the resonant rotation number CR of said rotator.

On the other hand, at outer circumference side of the case 41, outer support faces 205 and 206 keeping each steel ball 45 in outer circumference side at the rated rotation number UR of said rotator is annularly provided. Each of these outer support faces comprise a horizontal contacting face 205 and a vertical contacting face 206 contacting the outer surface of each steel ball 45. Lengths L1 and L2 of these outer support faces 205 and 206, which supports the steel balls 45, are shorter than the radius of the steel ball 45, and specifically are almost same as the radius of the steel ball 45.

Each of the outer support faces 205 and 206 is continuous with outer step portions 207 and 208 so as to define opened spaces S1 and S2 arranged at inner side of the outer support face 205 and upper side of the outer support face 206, respectively. A part of outer the surface of the steel ball supported by the outer support faces 205 and 206 is placed in both opened spaces S1 and S2.

An inclined guide face 42a is provide between the outer support faces 205 and 206 and said inner step portion 204. When each steel ball 45 is separated from the outer support faces 205 and 206 by that the rotation number of said rotator becomes low speed rotation less than the standard rotation number SR, each of these steel balls 45 moves to the inner step portion 204 along falling the inclined guide face 42a and is accepted inside of each recess portion 203.

Here, it is not need that the steel balls enter all of the recess portion 203, even if there are a few steel balls 45 not entering the recess portion 203, action and effect of the invention is obtained so long as there some steel balls enter the recess portion 203. That is, first, in the condition that the rotation number of the rotator is within the range of low speed rotation less than the standard rotation number SR, the steel ball 45 in the case 41 is held surely in the concave portion 203 by the inner step portion 204 formed in simple step shape. Thus, collision of the steel balls themselves at low speed rotation is surely prevented and generation of noise and damage due to the collision are prevented.

Since said recess portions 203 are arranged separating almost equal pitch in circumference direction, plural steel balls 45 are held in finely balanced state even at the range low speed rotation less than the standard rotation number SR of the rotator, and rotation condition of the rotator is kept in condition extremely stable.

On the other hand, when rotation number of the rotator becomes dangerous range exceeding the standard rotation number SR, the steel balls 45 move to an outside diameter side so as to climb over the inner step portion 204, thereby timing of start to move of the steel balls 45 is set in high accuracy.

Here, by setting so that the standard rotation number SR is almost same as the resonance resonant rotation number CR, when the rotation reaches the resonance resonant rotation number CR which is the earliest timing starting moving of the steel balls 45, the steel balls 45 start moving immediately so that rotation balance of the rotator is obtained extremely quickly. Since the standard rotation number SR is set so as to be slightly larger than the resonance resonant rotation number CR of the rotator, the steel balls 45 surely move to the direction taking balance of opposite side to the center of gravity position G (refer FIG. 4) of the rotator.

On the other hand, since there is provided the slope guide face 42a letting the steel balls 45 move to the inner step portion 204 side when the rotation number becomes lower than the standard rotation number SR, the steel balls 45 are surely returned to the inner step portion 204 at low speed rotation.

Since there are provided the opened spaces S1 and S2 defined by the outer step portions 207 and 208 and the outer support faces 205 and 206 holding the steel balls 45 at the rated rotation number UR, viscosity resistance to the surface of the steel balls 45 of air flow at high speed rotation is decreased so as to improve rotation driving efficiency.

Here, since the faces 205 and 206 supporting the steel balls 45 at the outer support faces 205 and 206 are set to as small size as possible providing the outer step portions 207 and 208, the opened spaces S1 and S2 are expanded degree of the size made small, and the viscosity resistance to the surface of the steel balls 45 of air flow at high speed rotation is further decreased so as to further improve rotation driving efficiency.

The invention is not limited to the above embodiment, and it is needless to say that the invention can have variation in the scope without departing from the point of the invention.

For example, although the recess portions 203 are provided the same number as the number of the steel ball 45 (6 pieces in the embodiment) in the embodiment, the recess portions 203 of the number more than 6 can be provided.

Although the supporting face of the outer support faces 205 and 206 holding the steel balls 45 is made of a flat face in the embodiment, curved face corresponding to curved face of outer the surface of the steel ball 45 is possible.

The invention can use similarly for except CD-ROM driving unit such as the embodiment, and can apply for various kinds of motor such as servomotor, air motor and etc. as a motor applicable.

Figure 7:
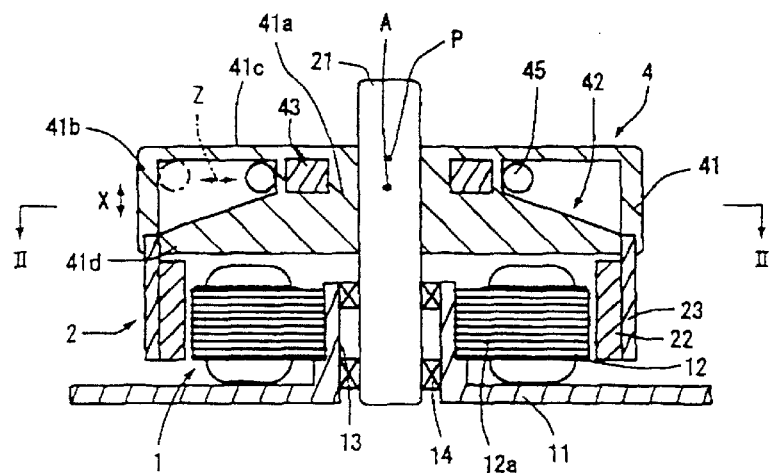
FIG. 7 is a vertical sectional view showing a motor provided with an automatic equalizer according to a third embodiment of the invention.
Figure 8:
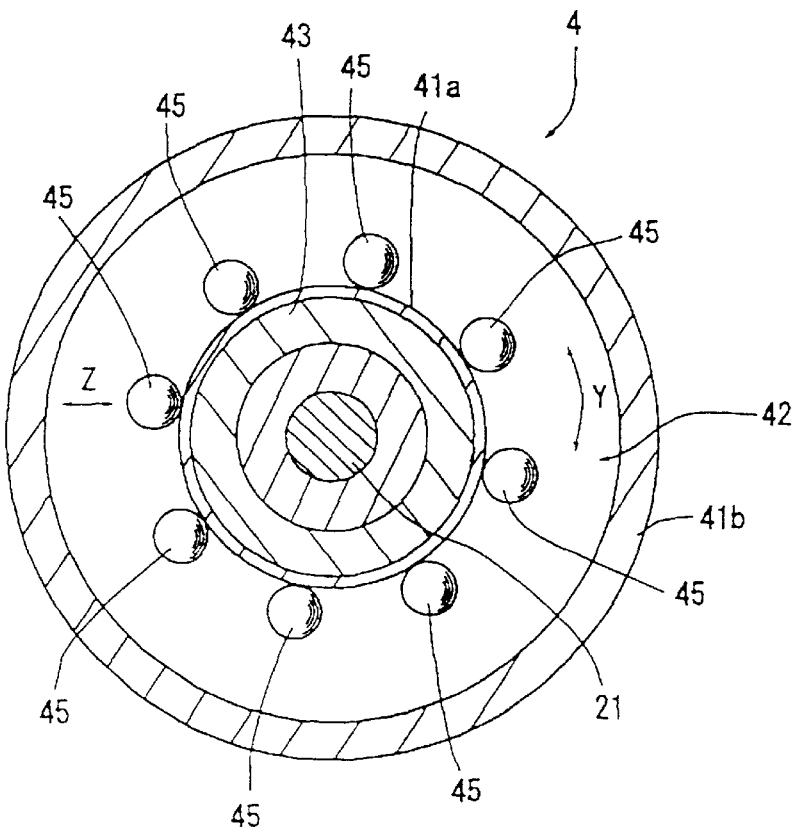
FIG. 8 is a sectional view of the automatic equalizer of FIG. 7 viewed from the line II—II.

Next, there will be explained below an automatic equalizer according to a third embodiment of the invention. As shown in FIGS. 7 and 8, the automatic equalizer 4 comprises: a case 41 fixed inserting in a rotary shaft 21 and forming a chamber 42 at inside thereof; an annular magnet 43 varied inside of diameter direction of the chamber 42; and plural steel balls 45 which are the balancer moving to shaft direction (X direction shown with arrows in FIG. 7) and circumference direction (Y direction shown with arrows in FIG. 8) with rotation of the rotary shaft 21 when the rotation number is higher than the resonant rotation number CR. In the embodiment, each steel ball 45 can move not to shaft direction and circumference direction but to radius direction (Z direction shown with arrows in FIG. 7 and FIG. 8).

The case 41 is formed by non-magnetic material such as synthetic resin which is easy in metal molding with low cost, and is not affected by magnetism of the annular magnet 43 arranged inside thereof. The case 41 is formed in disk shape at the external form and has a donut-shaped chamber 42 arranged so as to surround the supporting shaft 21 inside thereof. That is, the case 41 has a shaft fixing portion 41a fixed by the rotary shaft 21 at center of rotation side, a cylindrical outer circumference wall 41b, a circular first disc portion 41c connecting end faces of one side of the shaft fixing portion 41a and the outer circumference wall 41b, and a circular second disc portion 41d connecting end faces of other side of the shaft fixing portion 41a and the outer circumference wall 41b.

Although face of the chamber 42 side of the first disc portion 41c is formed in horizontal face shape, face of the chamber 42 side of the second disc portion 41d is formed with a slope inclining downward in FIG. 7 to outside of the radius direction. Because of this, the chamber 42 becomes wide in space of shaft direction as going toward outside of the radius direction. Therefore, the space where each steel ball 45 can move to the shaft direction becomes wide as the ball moves to outside of the radius direction where centrifugal force acts strongly. Because of this, automatic aligning action acts further usefully to bias load to the shaft direction.

The wall 41b forming inner wall constructing the outermost circumference portion the chamber 42 is constructed so as to be orthogonal to the first flat disk portion 41a, so that the distance from the innermost circumference portion to the outermost circumference portion is different at position differs in shaft direction. Specifically. upper side portion is short in distance to the innermost circumference portion comparing lower side portion at the outermost circumference portion of the wall 41b.

Accordingly, when the rotation number exceeds the resonant rotation number CR, the steel ball 45 intends to move to the upper side where the distance between the innermost circumference portion and the outermost circumference portion becomes short. This is because that the steel ball 45 intends to move to direction short in distance to the innermost circumference portion in the condition that the ball is swung to the outermost circumference portion. As the result, by smooth moving of the steel ball, automatic aligning action moving the center of gravity to the center position of rotation is operated in short time. In FIG. 7, point A is the center of gravity position of the rotator.

Although the inner wall of the wall 41b is parallel with the supporting shaft in the embodiment, the inner wall may be formed in arc shape so as to become all equal distance from rotation center portion (point P in FIG. 7) of horizontal face standardizing upper face of the chamber 42.

Figure 9A:
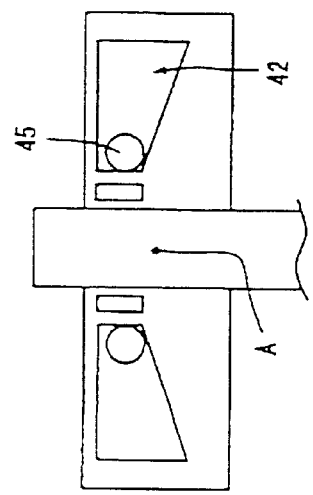
FIGS. 9A–9C are sectional views showing the operation principal of the automatic equalizer of FIG. 7.

At inside of diameter direction of the chamber 42, a magnet 43 is varied. The magnet 43 is almost same in dimensions of the shaft direction of the magnet and shaft direction of the innermost circumference portion of the chamber 42. As shown in FIG. 9A, the respective steel balls 45 are held in the magnet 43 when the rotor 2 stops or rotates at low rotation speed (namely, when the centrifugal force acting the steel balls 45 are small).

Figure 9B:
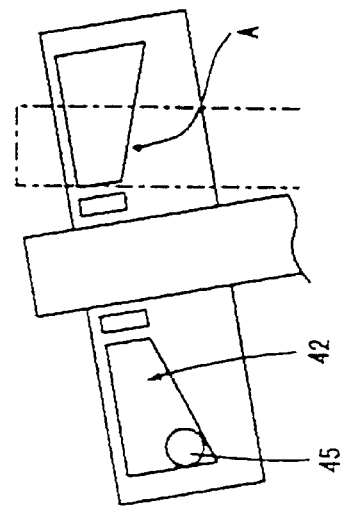

In a case where the holding force of the magnet 43 is small, when the rotation speed of the rotor 2 becomes high (but lower than the resonant rotation number), the steel balls 45 separate from the magnet 43, and move toward the center of gravity of the rotor 2, as shown in FIG. 9B.

In this embodiment, the holding force of the magnet 43 with respect to each steel ball is made large so as not to swing to outside by the centrifugal force before resonance. When the rotation number of the rotator exceeds the resonant rotation number CR, as shown in FIG. 9C, the steel balls 45 move toward an opposite direction of the center of gravity without passing through the state shown in FIG. 9B.

Figure 9C:
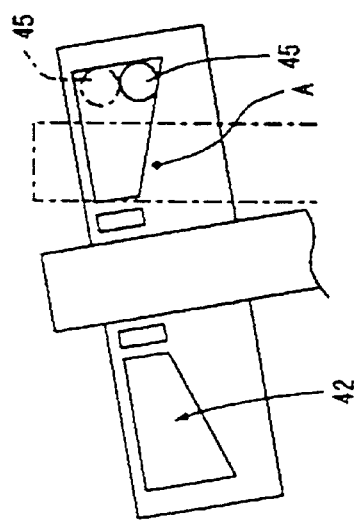

In aspect of the shaft direction of each steel ball 45, as shown with the solid line of FIG. 9C, the ball does not move to the shaft direction only moving to opposite direction of the center of gravity to circumference direction as at the beginning after resonance, however, the ball moves to upper part of the shaft direction gradually moving to the circumference direction (refer dot line of FIG. 9C). After that, each steel ball 45 takes balance moving to the circumference direction at the most upper portion of the outermost portion of the chamber 42. Such the operation, that is, operation that the steel ball 45 moves up acting against gravity is a phenomenon occurring when the rotation number of the rotator exceeds the resonant rotation number CR. The phenomenon decreases the swing of the center of rotation gravity corresponding to bias load at the shaft direction and acts so as to cancel vibration of the rotator.

Figure 10:
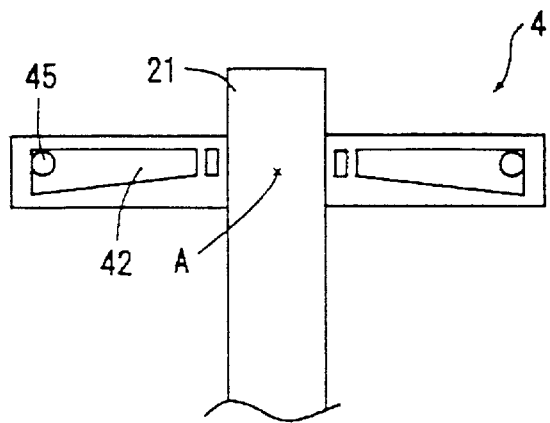
FIG. 10 is a sectional view showing the operation principal the automatic equalizer of FIG. 7, which shows a state that a rotor keeps entirely balance while rotation higher than resonant rotation number.

The state is shown in FIG. 10 that the rotor 2 and the disk are balanced entirely by such operation of the steel ball 45.

Thus, the center of rotation gravity of the rotator returns to the center position direction by moving to the circumference direction and the shaft direction of plural steel balls 45. By carrying out such the operation, the rotator can rotate at the state that vibration is canceled and swing of rotation is small.

Although the third embodiment is an example of preferred embodiment the invention, the invention is not limited by this and various kinds of variation is possible in the scope not departing from the point of the invention. For example, a driving device for rotating and operating the disk-shaped recording medium such as CD or the optomagnetic disk is shown in the third embodiment, however the invention has an effect on any application rotating and operating the rotator having high speed rotation exceeding the resonant rotation number without limiting the device rotating and operating the recording medium such as CD and the like.

In the embodiment, although the chamber 42 has a slope toward lower direction facing outer circumference side at the lower side face thereof without having a slope at the upper side face, so that the space of the shaft direction becomes gradually wide, and although the sectional shape of the outermost circumference portion is straight to the shaft direction, however, a sectional shape of the chamber 42 may be configured shown in FIGS. 11A and 11B and FIGS. 12A and 12B.

Figure 11A:
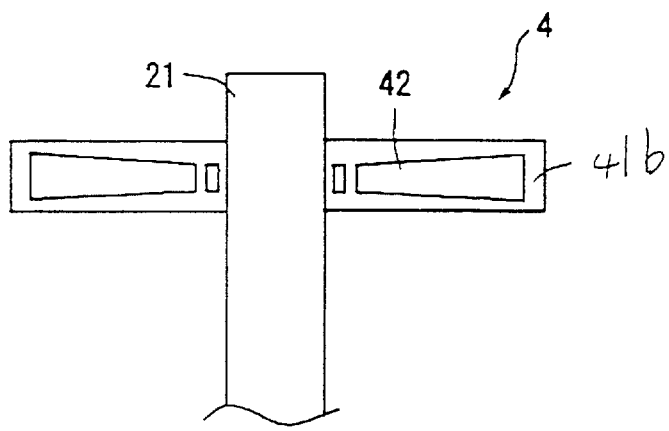
FIGS. 11A and 11B are sectional views showing modification examples of the automatic equalizer of FIG. 7.

In the example shown in FIG. 11A, an upper side face of the chamber 42 has a slope toward upper direction to the outer circumference side, and a lower side face of the chamber 42 has a slope toward lower direction facing the outer circumference side. The longitudinal section of the chamber forming portion of the wall 41b is straight to the shaft direction similarly as the third embodiment.

Figure 11B:
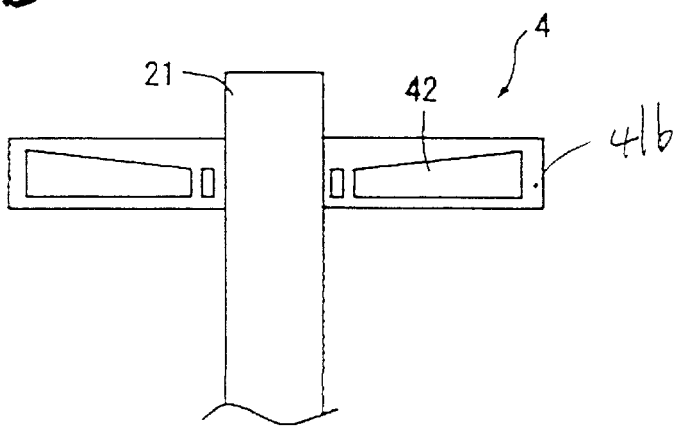

In the example shown in FIG. 11B, an upper side face of the chamber 42 has a slope toward upper direction facing the outer circumference side and lower side face of the chamber 42 does not have a slope. The longitudinal section of the chamber forming portion of the wall 41b is straight to the shaft direction similarly as the third embodiment.

Figure 12A:
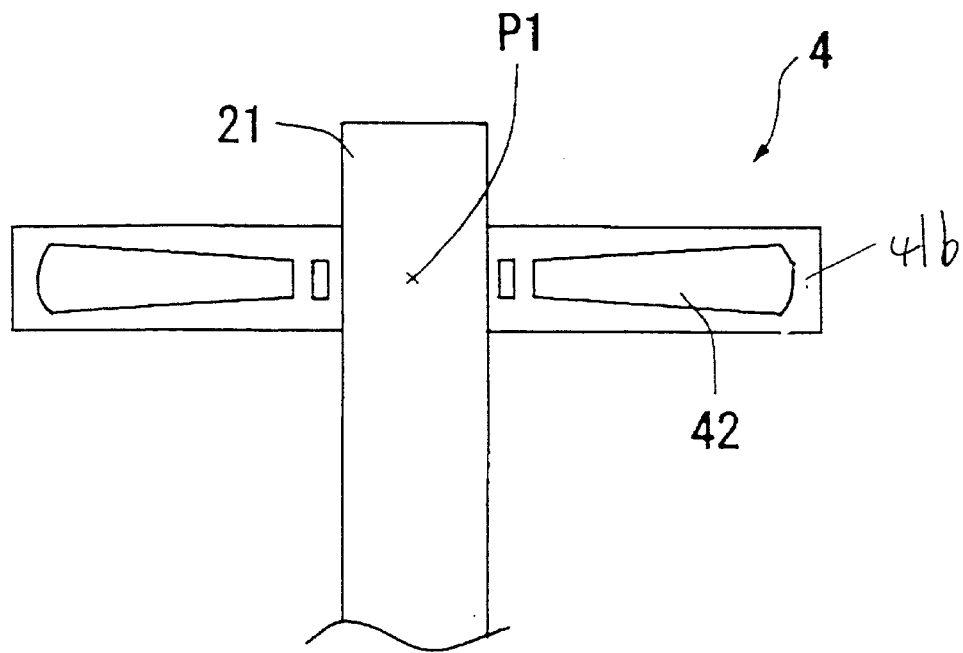
FIGS. 12A and 12B are sectional views showing modification examples of the automatic equalizer of FIG. 7.

In the example shown in FIG. 12A, similarly as the example shown in FIG. 11A, an upper side face of the chamber 42 has a slope toward the upper direction facing the outer circumference side and a lower side face of the chamber 42 has a slope toward the lower direction facing outer circumference side. The longitudinal section of the chamber forming portion of the wall 41b is formed in arc shape so as to be equal distance from a center P1 of rotation in a standardized horizontal face which is situated in the center of the shaft direction of the chamber 42.

Figure 12B:
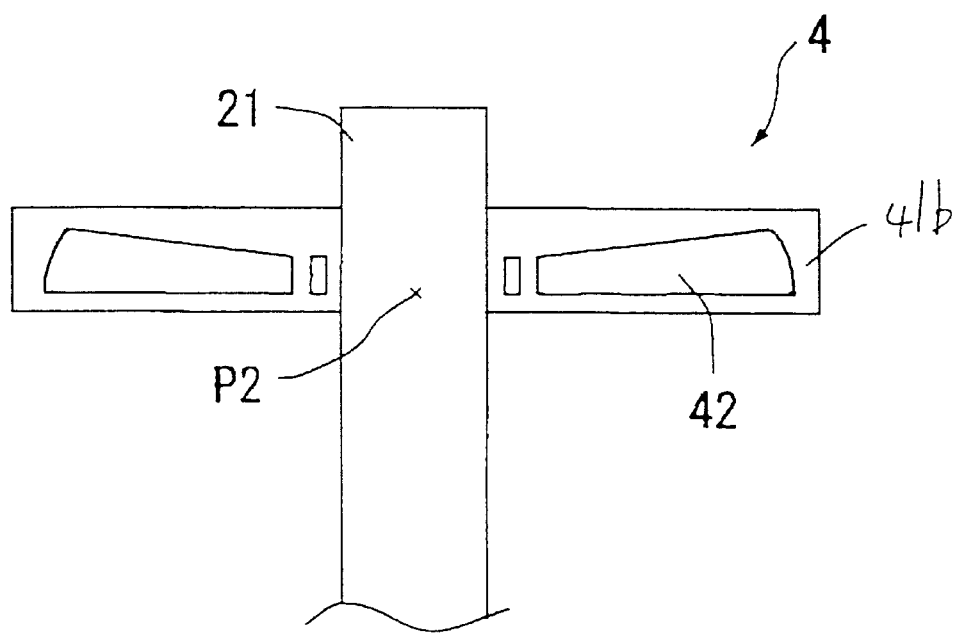

In the example shown in FIG. 12B, an upper side face of the chamber 42 has a slope toward the upper direction facing the outer circumference side and a lower side face of the chamber 42 does not have a slope. The longitudinal section of the chamber forming portion of the wall 41b is formed in arc shape so as to be equal distance from center P2 of rotation in a standardized horizontal face which is the lower face of the chamber 42.

Figure 13:
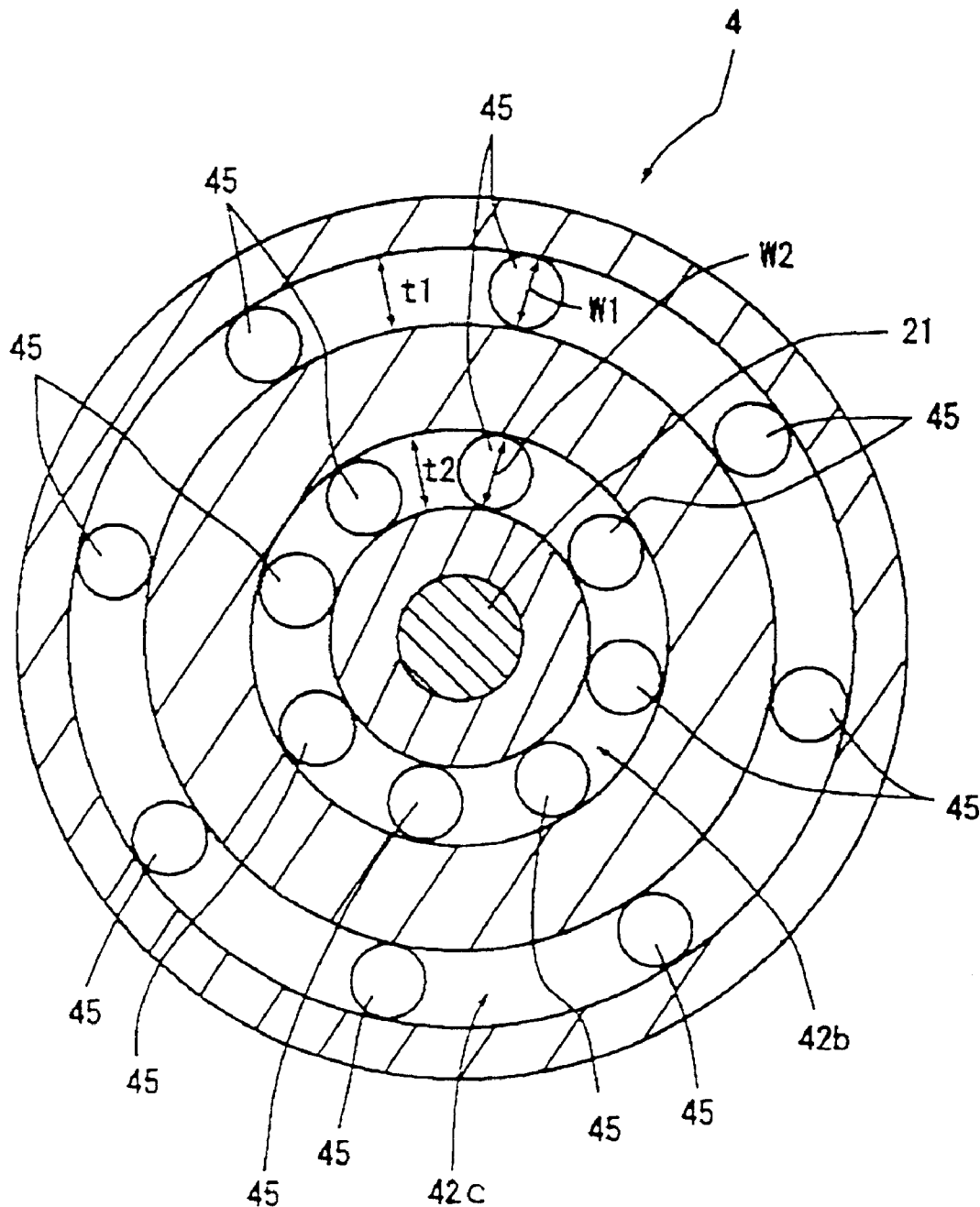
FIG. 13 is a sectional plane view showing an automatic equalizer according to a fourth embodiment of the invention.

As shown in FIG. 13, according to a fourth embodiment of the present invention, two chambers 42b and 42c may be provided at different positions of the radius direction so as to make independent spaces respectively. Although widths t1 and t2 in the radius direction of each chambers 42b and 42c are almost same dimensions as diameters w1 and w2 of each steel ball 45 stored therein. Each steel ball 45 does not move to the radius direction, but the balls can move to the shaft direction.

Although the steel ball 45 is used for the balancer in the above embodiments, the shape of the balancer is not limited in ball but may be a shape that the member can move in the chamber 42 of the case 41 by the centrifugal force, such as columnar or wine barrel shape. The invention is applied for a motor where the rotary shaft 21 is fixed at the stator hub 11 and a bearing member is arrange between the rotary shaft 21 and the case 41, or a motor where the rotor 2 is held by a case body arranged at outside of the rotor with a roller bearing and the like without having the supporting shaft 21.

What is claimed is:

1. An automatic equalizer for a motor, comprising:

a cylindrical case provided with a chamber, the case coaxially attached to a rotary shaft of the motor; and a plurality of balancers movably provided within the chamber so as to cancel a rotation eccentricity of the motor, wherein elasticity of at least each surface of the balancers are reduced by annealing.

2. An automatic equalizer for a motor, comprising:

a cylindrical case provided with a chamber, the case coaxially attached to a rotary shaft of the motor;

a plurality of balancers movably provided within the chamber so as to cancel a rotation eccentricity of the motor;

an inner step portion provided in a center portion of the chamber, for holding the balancers therein when a rotation number of the motor is lower than a predetermined standard rotation number, wherein the inner step portion has a height which is determined such that the balancer held in the recess portion climbs over the step portion and moves to a region outer than the recess portion by centrifugal force occurring when the rotation number exceeds the standard rotation number, wherein the inner step portion includes a plurality of independent recess portions for holding the respective balancers therein, which are arranged around the rotary shaft with a predetermined pitch.

3. The automatic equalizer as set forth in claim 2, wherein the standard rotation number is substantially same as a resonant rotation number of the motor.

4. The automatic equalizer as set forth in claim 3, wherein the standard rotation number is higher than the resonant rotation number.

5. The automatic equalizer as set forth in claim 2, further comprising a viscous member provided on at least one of a plurality of surfaces of the balancers and an inner face of the chamber.

6. The automatic equalizer as set forth in claim 5, wherein high viscosity fluid is provided as the viscous member.

7. An automatic equalizer for a motor, comprising:

a cylindrical case provided with a chamber, the case coaxially attached to a rotary shaft of the motor;

a plurality of balancers movably provided within the chamber so as to cancel a rotation eccentricity of the motor;

an inner step portion provided in a center portion of the chamber, for holding the balancers therein when a rotation number of the motor is lower than a predetermined standard rotation number, wherein the inner step portion has a height which is determined such that the balancer held in the recess portion climbs over the step portion and moves to a region outer than the recess portion by centrifugal force occurring when the rotation number exceeds the standard rotation number, wherein the chamber is provided with:

a holding member formed on an inner face of an outer circumference wall thereof, for holding the balancers thereon when the rotation number of the motor is a rated rotation number which is higher than a resonance rotation number of the motor; and a slope extending downward from the holding member to the inner step portion to guide the balancers to the inner step portion when the rotation number of the motor becomes lower than the standard rotation number.

8. The automatic equalizer as set forth in claim 7, further comprising a viscous member provided on at least one of a plurality of surfaces of the balancers and an inner face of the chamber.

9. The automatic equalizer as set forth in claim 8, wherein high viscosity fluid is provided as the viscous member.

10. An automatic equalizer for a motor, comprising:

a cylindrical case provided with a chamber, the case coaxially attached to a rotary shaft of the motor; and a plurality of balancers movably provided within the chamber so as to be movable in an axial direction of the rotary shaft and a circumference direction of the case, for canceling a rotation eccentricity of the motor, wherein the balancers start to move when a rotation number of the motor exceeds a resonant rotation number of the motor, wherein the balancers are movable in a radial direction of the case; and wherein a dimension in the axial direction of the chamber is made larger toward outside of the radial direction.

11. The automatic equalizer as set forth in claim 10, wherein a vertical cross section of an inner face at an outermost portion of the chamber is straight.

12. The automatic equalizer as set forth in claim 10, wherein a vertical cross section of an inner face at an outermost portion of the chamber is curved.

13. The automatic equalizer as set forth in claim 10, wherein a plurality of independent chambers are concentrically provided in the case.

14. The automatic equalizer as set forth in claim 10, further comprising a viscous member provided on at least one of a plurality of surfaces of the balancers and an inner face of the chamber.

15. The automatic equalizer as set forth in claim 14, wherein high viscosity fluid is provided as the viscous member.

* * * * *